No. 874,475. PATENTED DEC. 24, 1907.
H. P. YOST.
GRAIN AUGER MECHANISM.
APPLICATION FILED JAN. 14, 1907.
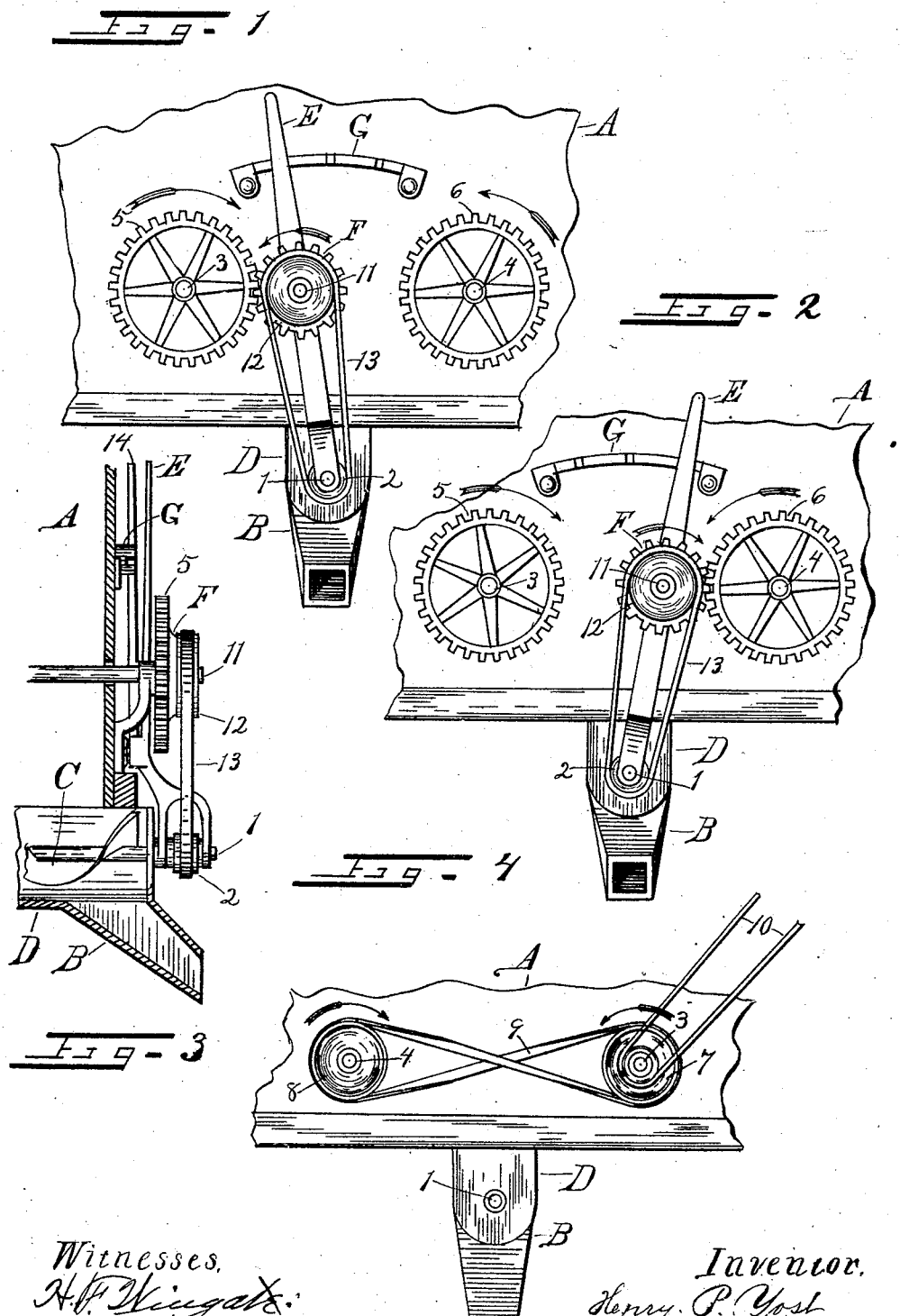
Witnesses,
H. F. Wingate.
F. H. Wingate.
Inventor,
Henry P. Yost
By Victor E. Randall
Atty.

UNITED STATES PATENT OFFICE.

HENRY P. YOST, OF TEKONSHA, MICHIGAN.

GRAIN-AUGER MECHANISM.

No. 874,475.  Specification of Letters Patent.  Patented Dec. 24, 1907.

Application filed January 14, 1907. Serial No. 352,120.

*To all whom it may concern:*

Be it known that I, HENRY P. YOST, a citizen of the United States, residing at Tekonsha, in the county of Calhoun and State of Michigan, have invented a certain new and useful Improvement in Grain-Auger Mechanism; and I hereby declare the following to be a full, clear, and exact description thereof, such as will enable others skilled in the art to which it appertains to make and use the same, reference being had to the accompanying drawings, and to the letters and figures marked thereon, which form a part of this specification.

My invention relates to grain auger mechanism, and more particularly relates to mechanism for reversing the motion of grain augers employed on grain threshing and shucking machinery.

The object of the present invention is to so construct a device for the purpose that it will obviate the necessity of an attendant to stop the machinery in order to regulate the throw of the auger when discharging grain from one side of the machine to the other, and vice versa. It has been customary to shift a belt either by crossing the same, or to cause the same to engage an oppositely-revoluble shaft to facilitate the direction of the auger in discharging grain from a threshing machine. My invention overcomes this difficulty by employing a shifting lever conveniently located and capable of being shifted from one position to another at any time while the machinery is in operation to effect the desired result, as will be set forth and described in the following specification, pointed out in the drawing and set forth in the claims hereunto appended, which form a part of this specification.

In the drawings, Figure 1 represents a part of a threshing machine with my auger-shifting mechanism applied and the lever thrown to the left. Fig. 2 is a like view with the shifting lever thrown to the right. Fig. 3 is a detail in part cross-section, of my improved grain auger-shifting mechanism, and Fig. 4 is a side view in part of a threshing machine the reverse of the auger-shifting mechanism.

In the drawings, like marks of reference refer to corresponding parts throughout the different views.

A, represents so much of a threshing machine as will be sufficient to show the relation of my auger mechanism thereto, B, a grain discharge spout, C, a grain auger or conveyer, D, grain conveying trough, E, a shifting lever, F, an intermediate spur gear operative from a spindle on said lever, and G, a quadrant to regulate the throw of said lever.

The location of the grain auger, its conveying trough and discharge spout, customarily are arranged below a threshing machine and to the rear of the fanning mill, but the arrangement and construction of these parts will not be dwelt upon, but will be left to the dictates of the mechanic in the construction of a machine.

The grain auger shaft, 1, upon the side of the machine to which the shifting mechanism is applied, passes through the end of the conveyer trough sufficiently to receive a belt wheel, 2, the lower end of the shifting lever, E, forming a yoke striding the belt wheel, as shown, the object of the yoke being to give its pivotal connection where it is received by said shaft, a long, firm and stable bearing.

Parallel with and located above and on either side of the auger shaft, constantly-driven oppositely-rotatable shafts, 3 and 4, are mounted. These shafts are provided with spur gears, 5 and 6, on the side of the machine where the shifting lever, E, is mounted, and their opposite ends are provided with belt wheels, 7 and 8, connectively operated by a cross belt, 9, (see Fig. 4), a drive belt, 10, operating the same. The belt 9 being a cross belt, the shafts 3 and 4 carrying the spur gears 5 and 6, will be caused to revolve in opposite directions, as will be indicated by the arrows.

To a stud, 11, of the lever, E, an intermediate spur gear, F, is mounted. A belt wheel, 12, is operated by this gear and from this belt wheel, a belt, 13, engages and operates the auger wheel, 2.

G, is a quadrant of the usual construction, and 14 is a hand latch of the lever E. In operation when the lever, E, is passed along the quadrant, G, sufficiently to cause the intermediate gear, F, to engage either of the wheels, 5 or 6, the same will be caused to rotate, the wheel, 12, causing the belt, 13, to rotate the grain-conveying auger, C.

To shift the direction of the auger and discharge grain from an opposite side of the machine, the lever, E, is thrown or shifted across the quadrant, G, until the intermediate gear, F, engages an opposite driving gear, the gears 5 and 6 being oppositely rotated causing the direction of the auger to rotate relative to the engagement of the intermediate gear, F, therewith.

Having, therefore, set forth my invention, what I claim as new and desire to secure by Letters Patent, is:—

1. In a device of the class, two oppositely-revoluble shafts, a grain auger and means by which said auger may be reversed by engagement from one of said shafts to another.

2. In a device of the class, two oppositely-revoluble shafts, a grain auger, a lever, means by which said auger may be reversed by the shifting of said lever in its relation, from one of said shafts to another.

3. In a device of the class, two oppositely-revoluble shafts, a grain auger, a lever pivotally suspended between said shafts, and means by which said auger may be reversed by the shifting of said lever in its relation, from one of said shafts to another.

4. In a device of the class, two oppositely-revoluble shafts, a grain auger, a lever axially supported from said auger and means by which said auger may be reversed by the shifting of said lever in its relation, from one of said shafts to another.

5. In a device of the class, two oppositely-revoluble shafts, a grain auger situated therebetween, a lever and means by which said auger may be reversed by the shifting of said lever in its relation to and from one shaft to another.

6. In a device of the class, two oppositely-disposed, oppositely-revoluble shafts, a grain auger intermediately disposed therebelow, a lever axially mounted to said auger, a quadrant to regulate the pitch of said lever, and means by which said auger may be reversed by the shifting of said lever to and from one of said shafts to another.

7. In a device of the class, two oppositely-disposed, oppositely-revoluble shafts arranged on a common plane, a grain auger intermediately disposed therebelow, a lever axially pivoted to the outer extremity of said auger and adapted to play between said shafts, a quadrant to regulate the pitch of said lever, a stud on said lever, an intermediate gear on said stud, and gears on the ends of said shafts between which said lever is adapted to play, and means connecting said intermediate gear with said auger that when said lever is thrown to engage said intermediate gear with a gear on one of said shafts, said auger will rotate according to its relation with said gear.

8. In a device of the class, two oppositely-disposed, oppositely-revoluble shafts arranged on a common plane, a grain auger intermediately disposed therebelow, a lever axially pivoted to the outer extremity of said auger and adapted to play between said shafts, a quadrant to regulate the pitch of said lever, a stud on said lever, an intermediate gear on said stud, and gears on the ends of said shafts between which said lever is adapted to play, a belt wheel on said auger shaft, a belt wheel operative with said intermediate gear and a belt connecting said belt wheel with the belt wheel of said auger, all arranged to co-act substantially as, and for the purpose set forth.

HENRY P. YOST.

Witnesses:
W. A. HOWARD,
T. P. PHILLIPS.